US012783850B2

(12) United States Patent
Tagliasacchi et al.

(10) Patent No.: US 12,783,850 B2
(45) Date of Patent: Nov. 3, 2026

(54) MULTI-TASK ADAPTER NEURAL NETWORKS

(71) Applicant: Google LLC, Mountain View, CA (US)

(72) Inventors: Marco Tagliasacchi, Zurich (CH); Félix de Chaumont Quitry, Zurich (CH); Dominik Roblek, Zurich (CH)

(73) Assignee: Google LLC, Mountain View, CA (US)

( * ) Notice: Subject to any disclaimer, the term of this patent is extended or adjusted under 35 U.S.C. 154(b) by 1169 days.

(21) Appl. No.: 17/764,005

(22) PCT Filed: Sep. 23, 2020

(86) PCT No.: PCT/US2020/052230
§ 371 (c)(1),
(2) Date: Mar. 25, 2022

(87) PCT Pub. No.: WO2021/061781
PCT Pub. Date: Apr. 1, 2021

(65) Prior Publication Data

US 2022/0383112 A1 Dec. 1, 2022

Related U.S. Application Data

(60) Provisional application No. 62/906,035, filed on Sep. 25, 2019.

(51) Int. Cl.
*G06N 3/04* (2023.01)
*G06N 3/045* (2023.01)
(Continued)

(52) U.S. Cl.
CPC ........... *G06N 3/045* (2023.01); *G06N 3/0455* (2023.01); *G06N 3/048* (2023.01); *G10L 25/30* (2013.01)

(58) Field of Classification Search
CPC .......... G06N 3/048; G06N 3/08; G06N 3/084; G06N 3/045; G06N 3/455; G06N 3/04
See application file for complete search history.

(56) References Cited

U.S. PATENT DOCUMENTS 10,891,539 B1 * 1/2021 Kearney ............... G06F 18/217
2017/0011280 A1 * 1/2017 Soldevila ............. G06V 10/454
(Continued)

FOREIGN PATENT DOCUMENTS

CN 109328362 A 2/2019
CN 110168578 A 8/2019

OTHER PUBLICATIONS

NPL Houlsby Parameter-Efficient Transfer Learning for NLP Jun. 2019.*
(Continued)

*Primary Examiner* — Paul M Knight
(74) *Attorney, Agent, or Firm* — Fish & Richardson P.C.

(57) ABSTRACT

A system including a multi-task adapter neural network for performing multiple machine learning tasks is described. The adapter neural network is configured to receive a shared input for the machine learning tasks, and process the shared input to generate, for each of the machine learning tasks, a respective predicted output. The adapter neural network includes (i) a shared encoder configured to receive the shared input and to process the shared input to extract shared feature representations for the machine learning tasks, and (ii) multiple task-adapter encoders, each of the task-adapter encoders being associated with a respective machine learning task in the machine learning tasks and configured to: receive the shared input, receive the shared feature representations from the shared encoder, and process the shared
(Continued)

input and the shared feature representations to generate the respective predicted output for the respective machine learning task.

24 Claims, 4 Drawing Sheets

(51) Int. Cl.
*G06N 3/0455* (2023.01)
*G06N 3/048* (2023.01)
*G10L 25/30* (2013.01)

(56) References Cited

U.S. PATENT DOCUMENTS

2018/0357538 A1* 12/2018 Hwang .................. G06F 17/16
2019/0130273 A1* 5/2019 Keskar .................... G06F 40/47
2019/0130275 A1* 5/2019 Chen ...................... G06N 20/00
2021/0192357 A1* 6/2021 Sinha ..................... G06N 3/045

OTHER PUBLICATIONS

NPL Johnson Google's Multilingual Neural Machine Translation System 2017.*
NPL Ruder an Overview of Multi Task Learning in DNNs 2017.*
NPL Sosnin a Survey of Multi task Learning Methods in Chemoinformatics Nov. 2018.*
NPL Stickland 36th International Conference on Machine Learning Jun. 2019.*
NPL Tagliasacchi Multi Task Adapters for on Device Audio Inference 2020 Inventor Pub.*
NPL Zeng Specrogram based multi-task audio classification 2017.*
Office Action in European Appln. No. 20789334.8, mailed on Nov. 11, 2024, 12 pages.
Cheung et al., "Superposition of many models into one," Advances in Neural Information Processing Systems 32, NeurIPS, 2019, pp. 1-10.
Cui et al., "Large Scale Fine-Grained Categorization and Domain-Specific Transfer Learning," Proceedings of the IEEE Conference on Computer Vision and Pattern Recognition (CVPR), 2018, pp. 4109-4118.
Donahue et al., "DeCAF: A Deep Convolutional Activation Feature for Generic Visual Recognition," International Conference on Machine Learning (ICML), Proceedings of the 31st International Conference on Machine Learning, PMLR, 2014, 32:647-655.
Engel et al., "Neural Audio Synthesis of Musical Notes with WaveNet Autoencoders," Proceedings of the 34th International Conference on Machine Learning, PMLR, 2017, 70:1068-1077.
Gemmeke et al., "Audio Set: An ontology and human-labeled dataset for audio events," 2017 IEEE international conference on acoustics, speech and signal processing (ICASSP), Mar. 2017, pp. 776-780.
Georgiev et al., "Low-resource Multitask Audio Sensing for Mobile and Embedded Devices via Shared Deep Neural Network Representations," Proceedings of the ACM on Interactive, Mobile, Wearable and Ubiquitous Technologies, 2017, pp. 1-19.
Gordon et al., "MorphNet: Fast & Simple Resource-Constrained Structure Learning of Deep Networks," Proceedings of the IEEE Conference on Computer Vision and Pattern Recognition (CVPR), 2018, pp. 1586-1595.
Hershey et al., "CNN architectures for large-scale audio classification," arXiv, Sep. 29, 2016, 5 pages.
Houlsby et al., "Parameter-Efficient Transfer Learning for NLP," Proceedings of the 36th International Conference on Machine Learning, PMLR, May 2019, 97:2790-2799.
International Preliminary Report on Patentability in International Appln. No. PCT/US2020/052230, mailed on Apr. 7, 2022, 11 pages.
International Search Report and Written Opinion in International Appln. No. PCT/US2020/052230, mailed on Jan. 28, 2021, 45 pages.
Kaiser et al., "One Model to Learn Them All," arXiv, Jun. 16, 2017, pp. 1-10.
Lee et al., "Label-efficient audio classification through multitask learnign and self-supervision," arXiv, Oct. 19, 2019, pp. 1-10.
Maninis et al., "Attentive single-tasking of multiple tasks," Proceedings of the IEEE/CVF Conference on Computer Vision and Pattern Recognition (CVPR), Jun. 2019, pp. 1851-1860.
Mudrakarta et al., "K for the Price of 1: Parameter Efficient Multi-task and Transfer Learning," arXiv, Oct. 25, 2018, pp. 1-15.
Panayotov et al., "LibriSpeech: An ASR Corpus Based on Public Domain Adio Books," 2015 IEEE International Conference on Acoustics, Speech and Signal Processing (ICASSP), Apr. 19, 2015, pp. 5206-5210.
Rebuffi et al., "Efficient parametrization of multidomain deep neural networks," Proceedings of the IEEE Conference on Computer Vision and Pattern Recognition (CVPR), 2018, pp. 8119-8127.
Rebuffi et al., "Learning multiple visual domains with residual adapters.," Advances in Neural Information Processing Systems 30 (NIPS), May 2017, pp. 1-11.
Snyder et al., "MUSAN: A Music, Speech, and Noise Corpus," arXiv, Oct. 28, 2015, pp. 1-4.
Stowell et al., "Automatic acoustic detection of birds through deep learning: the first Bird Audio Detection challenge," Methods in Ecology and Evolution, Mar. 2018, 10:368-380.
Tagliasacchi et al., "Multi-task adapters for on-device audio inference," 8th International Conference on Learning Representations (ICLR), Apr. 2020, 10 pages.
Tagliasacchi et al., "Self-supervised audio representation learning for mobile devices," arXiv, May 24, 2019, pp. 1-11.
Warden et al., "Speech Commands: A Dataset for Limited-Vocabulary Speech Recognition," arXiv, Apr. 9, 2018, pp. 1-11.
Yosinski et al,. "How transferable are features in deep neural networks?" Advances in Neural Information Processing Systems 27 (NIPS), 2014, pp. 1-9.
Zeng et al., "Spectrogram based multi-task audio classification," Multimedia Tools and Applications, Dec. 26, 2017, pp. 3705-3722.
Office Action in European Appln. No. 20789334.8, dated Oct. 6, 2023, 9 pages.
Office Action in Chinese Appln. No. 202080066037.8, mailed on Nov. 7, 2025, 20 pages (with machine translation).
Office Action in Chinese Appln. no. 202080066037.8, mailed on Jul. 16, 2025, 21 pages (with machine translation).

* cited by examiner

TABLE I: Accuracy vs. cost.

| | | Cost measure: Num. params | | Cost measure: FLOPs | |
|---|---|---|---|---|---|
| Task | Multi-head | $\lambda = 10^{-2}$ | $\lambda = 10^{-4}$ | $\lambda = 10^{-2}$ | $\lambda = 10^{-4}$ |
| MUS | 0.93 ± 0.02 | 0.94 ± 0.01 (+1k) | 0.94 ± 0.02 (+11k) | 0.93 ± 0.00 (+0.8m) | 0.95 ± 0.01 (+4.6m) |
| LSP | 0.91 ± 0.01 | 0.94 ± 0.01 (+5k) | 0.95 ± 0.01 (+47k) | 0.92 ± 0.01 (+2.1m) | 0.95 ± 0.01 (+5m) |
| BSD | 0.75 ± 0.00 | 0.75 ± 0.00 (+1k) | 0.76 ± 0.01 (+25k) | 0.75 ± 0.01(+1.6m) | 0.76 ± 0.01 (+4.6m) |
| TUT | 0.70 ± 0.02 | 0.74 ± 0.01 (+6k) | 0.75 ± 0.02 (+29k) | 0.72 ± 0.01 (+2.4m) | 0.77 ± 0.01 (+4.6m) |
| SPC | 0.65 ± 0.01 | 0.66 ± 0.00 (+4k) | 0.67 ± 0.01 (+26k) | 0.65 ± 0.01 (+2.2m) | 0.66 ± 0.01 (+4.7m) |
| LID | 0.62 ± 0.04 | 0.69 ± 0.02 (+10k) | 0.69 ± 0.02 (+32k) | 0.65 ± 0.02 (+2.3m) | 0.69 ± 0.02 (+4.9m) |
| NPI | 0.60 ± 0.01 | 0.66 ± 0.01 (+20k) | 0.69 ± 0.01 (+41k) | 0.62 ± 0.01 (+2.4m) | 0.71 ± 0.01 (+5m) |
| NIF | 0.54 ± 0.01 | 0.58 ± 0.01 (+18k) | 0.57 ± 0.01 (+33k) | 0.55 ± 0.01 (+2.4m) | 0.59 ± 0.01 (+5m) |
| Mean | 0.71 ± 0.01 | 0.74 ± 0.01 (+8k) | 0.75 ± 0.01 (+30k) | 0.72 ± 0.01 (+2.0m) | 0.76 ± 0.01 (+4.8m) |

FIG. 4

MULTI-TASK ADAPTER NEURAL NETWORKS

CROSS REFERENCE TO RELATED APPLICATIONS

This application is a National Stage Application under 35 U.S.C. § 371 and claims the benefit of International Patent Application No. PCT/US2020/052230, filed on Sep. 23, 2020, which claims priority to U.S. Provisional Patent Application No. 62/906,035, filed on Sep. 25, 2019, the entire contents of which are hereby incorporated by reference.

BACKGROUND

This specification relates to machine learning models for performing multiple machine learning tasks, for example different digital audio processing tasks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output

SUMMARY

This specification describes a system implemented as computer programs on one or more computers in one or more locations that includes a multi-task adapter neural network that is configured to perform multiple machine learning tasks simultaneously.

The subject matter described in this specification can be implemented in particular embodiments so as to realize one or more of the following advantages.

The deployment of deep neural networks on mobile devices may require the efficient use of scarce computational resources, e.g. available memory or computing cost. When addressing multiple tasks simultaneously, it may be extremely important to share resources across tasks, especially when the tasks consume the same input data, e.g., audio samples captured by on-board microphones.

The multi-task adapter neural network described herein can solve multiple tasks simultaneously and more accurately by sharing representations via a shared encoder and task-specific adapter encoders at different depths. This allows common representations to be augmented, which in turn leads to better performance, e.g., higher accuracy, for the multi-task adapter neural network. In addition, by using a gating mechanism controlled by a small set of trainable variables that determine whether each channel of the task-adapter encoders is used as input to the next layer, the multi-task adapter neural network can effectively decide not to use some of the channels. This technique enables the multi-task adapter neural network to allocate an available computational budget to tasks and layers in a computational efficient way, for example by minimizing a computational cost measure such as a number of floating point operations (FLOPs) required to perform the tasks or a number of parameters of the neural network. The techniques described in this specification are particularly advantageous in situations that require an efficient use of scare computational resources, for example, when deploying deep neural networks on a mobile device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows experimental results where the use of the described multi-task adapter neural network results in higher accuracy compared to using a baseline architecture given the same target computational cost.

Like reference numbers and designations in the various drawings indicate like elements.

DETAILED DESCRIPTION

This specification describes a system implemented as computer programs on one or more computers in one or more locations that includes a multi-task adapter neural network that is configured to perform multiple machine learning tasks simultaneously.

Generally, the multi-task adapter neural network is configured to receive a shared input for multiple machine learning tasks and to process the shared input to generate, for each of the multiple machine learning tasks, a respective predicted output.

For example, the shared input can be an audio recording and multiple machine learning tasks can be different audio processing tasks, e.g., speech recognition, language identification, hotword detection, content classification, and so on.

As another example, the shared input can be an image and the multiple machine learning tasks can be different image processing tasks, e.g., image classification, object detection, semantic segmentation, and so on.

As yet another example, the shared input can be a sequence of text and the multiple machine learning tasks can be different natural language processing tasks, e.g., machine translation into one or more languages, natural language understanding tasks, e.g., an entailment task, a paraphrase task, a textual similarity task, a sentiment task, a sentence completion task, a grammaticality task, and so on.

Figure 1:
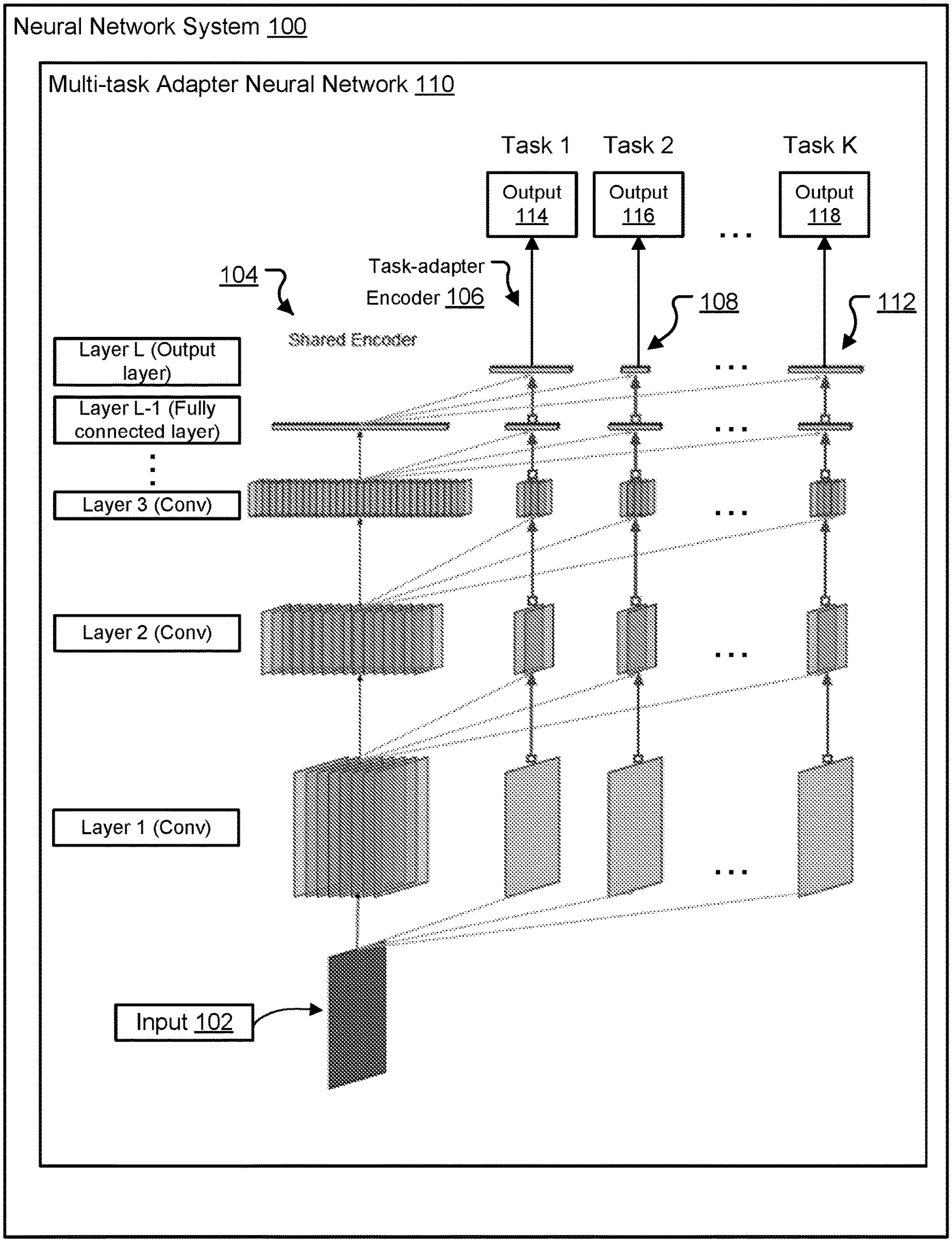
FIG. 1 shows an example neural network system including a multi-task adapter neural network.

FIG. 1 shows an example neural network system 100. The neural network system 100 is an example of a system implemented as computer programs on one or more computers in one or more locations, in which the systems, components, and techniques described below can be implemented.

The neural network system 100 includes a multi-task adapter neural network 110. The multi-task adapter neural network 110 includes a shared encoder 104 and multiple task-adapter encoders (e.g., K task-adapter encoders including the task-adapter encoders 106, 108, . . . , 112). As shown in FIG. 1, the task-adapter encoders can be arranged in parallel with the shared encoder. Some or all of the layers in a task adapter encoder can receive as input the concatenation of the activations of the previous layer computed by both the shared encoder and the task adapter itself. Thus, in some implementations, there is no inter-dependencies between tasks, such that during inference it is possible to compute simultaneously either all tasks or a subset of them, depending on the available resource budget for the system 100 Generally, the shared encoder 104 is configured to receive a shared input 102 and to process the shared input 102 through each of multiple layers of the shared encoder 104 to extract shared feature representations (e.g., embeddings) of the shared input 102. The multiple machine learning tasks all operate on the same type of input, i.e., so that all of the multiple tasks can be performed on the same received shared input. The shared feature representations are shared among the multiple machine learning tasks and are used to compute a predicted output for each task.

As a particular example, when the multiple tasks are audio processing tasks, the shared input 102 can be a two-dimensional channel input. For example, the shared input 102 is an audio recording that has a two-dimensional channel for time and frequency.

Each of the task-adapter encoders is associated with a respective machine learning task of the multiple machine learning tasks. Each task-adapter encoder is configured to receive the shared input 102, to receive the shared feature representations from the shared encoder, and to process the shared input 102 and the shared feature representations to generate the respective predicted output for each of the one or more machine learning tasks.

Generally, the shared encoder 104 is a convolutional neural network that includes multiple convolutional neural network layers. Each of the task-adapter encoders is also a convolutional neural network that includes multiple convolutional neural network layers. The shared encoder 104 and each of the task-adapter encoders have the same number of convolutional neural network layers.

In some implementations, the shared encoder 104 includes multiple convolutional neural network layers and a fully connected neural network layer.

In some implementations, each of the plurality of task-adapter encoders includes multiple convolutional neural network layers followed by a max-pooling neural network layer and a fully connected neural network layer.

In particular, in some implementations, both the shared encoder 104 and each of the K task-adapter encoders include the same number of convolutional neural network layers (e.g., layer 1, layer 2, layer 3, . . . , as shown in FIG. 1), followed by a global max-pooling neural network layer (not shown) and a fully connected neural network layer (e.g., layer L−1), for a total of L layers.

In some implementations, each convolutional neural network layer in the shared encoder 104 and the task-adapter encoders is followed by a max-pooling neural network layer (e.g., to reduce time-frequency dimensions by a factor of two at each layer), a ReLU non-linearity layer and batch normalization layer. Finally, a global max-pooling layer is followed by a fully-connected layer.

In some implementations, each of the task-adapter encoders includes an output layer (e.g., layer L in FIG. 1) as the last layer (e.g., following the fully connected neural network layer). That is, each task-adapter encoder includes an appropriate kind of output layer for the corresponding machine learning task. For example, for classification tasks, the output layer is a softmax neural network layer. The output layer of each task-adapter encoder is configured to receive as input a concatenation of (i) the output produced by the last layer of the shared encoder 104 and (ii) the layer output produced by the previous layer of the task-adapter encoder, and to process the input to generate a predicted output for the respective machine learning task.

Each of the neural network layers in the shared encoder 104 receives as input an output of the previous neural network layer in the shared encoder 104 and outputs a three-dimensional tensor which is a stack of two-dimensional channel outputs.

Each of the neural network layers of each of the task-adapter encoders receives as layer input a concatenation of (i) a three-dimensional tensor outputted by the previous layer in the task-adapter encoder and (ii) a three-dimensional tensor outputted by the corresponding previous layer in the shared encoder 104 along the third dimension (i.e., the channel dimension). The layer input is a stack of two-dimensional channel inputs. Each of the neural network layers of each task-adapter encoder then processes the layer input to output a three-dimensional tensor which is a stack of two-dimensional channel outputs.

In particular, let $f_{k,i}(\bullet)$, i=1, . . . L denote the function computed by each neural network layer of the shared encoder 104 and the task-adapter encoders at depth i, where L is the total number of layers. To simplify the notation, let k=0 denote the shared encoder 104 and k=1, . . . , K denote the K task specific encoders. The function $f_{k,i}(\bullet)$ produces as output a three-dimensional tensor of size $T_i \times F_i \times C_{k,i}$ which is a stack of two-dimensional channel outputs of size $T_i \times F_i$, where $T_i$ is the number of temporal frames, $F_i$ is the number of frequency bins, and $C_{k,i}$ is the number of output channels associated with layer i of encoder k. The number of temporal frames $T_i$ and frequency bins $F_i$ is the same for all values of k. For the task-adapter encoders, a number of task-specific channels $C_{k,i}=\max(1, \lfloor \alpha_i C_{0,i} \rfloor)$ are included, where $C_{0,i}$ and $\alpha_i$ are hyper-parameters that determine a maximum achievable complexity of the neural network 110 (such that the cost for deploying the neural network 110 does not exceed the available computational budget). While it is possible to use a different value of $\alpha_i$ at each layer, throughout the rest of this specification, it is assumed that $\alpha_i=\alpha$ for i=1, . . . , L for simplicity.

In the shared encoder 104, $f_{0,i}$ receives as input only the output of the previous layer in the shared encoder 104. However, in each task-adapter encoder, $f_{k,i}$, k≠0, receives as input a concatenation of the output of the previous layer of the shared encoder 104 (i.e., the output of $f_{0,i-1}$) and the output of the previous layer of the task-adapter encoder (i.e., the output of $f_{k,i-1}$) along the channel dimension. Therefore, the computational cost of computing the output of $f_{k,i}$, k≠0, can be expressed as:

$$\mathrm{cost}_{k,i} = \eta_{i,k} \cdot C_{k,i} \cdot (C_{0,i-1} + C_{k,i-1}) \tag{1}$$

with $C_{0,0}=1$ and $C_{k,0}=1$ for k≠0, and $\eta_{i,k}$ is a cost scaling factor.

The cost scaling factor $\eta_{i,k}$ is a constant value that can be computed based on at least one of: i) the intrinsic architecture of the neural network layer, ii) the known sizes $T_i \times F_i$, or iii) a target computational cost measure. The target computational cost measure can be a number of floating point operations (FLOPs) or a number of parameters of the neural network 110.

Equation 1 implies that the computational cost of computing the output of each neural network layer of each task-adapter encoder is proportional to the number of output channels $C_{k,i}$ multiplied by the number of input channels $(C_{0,i-1}+C_{k,i-1})$. In other words, the computational cost of each neural network layer in each task-adapter encoder is proportional to the number of two-dimensional (2D) channel outputs in the stack of 2D channel outputs of the neural network layer multiplied by the number of 2D channel inputs in the stack of 2D inputs of the neural network layer.

The techniques described in this specification aim at learning how to scale the number of channels to be used in each neural network layer of the each task-adapter encoder, i.e., to determine $c_{i,k} \leq C_{k,i}$, subject to a constraint on the total computational cost. To do this, each task-adapter encoder uses a gating mechanism that controls the flow of activations in the task-adapter encoder. In particular, for each neural network layer, each task-adapter encoder uses $C_{k,i}$ additional trainable variables (also referred to as "channel selection variables") $a_{k,i}=[a_{k,i,1}, \ldots, a_{k,i}, c_{k,i}]$ to modulate the 2D channel output of each channel. In other words, each 2D channel output in the stack of 2D channel outputs generated by each neural network layer in each task-adapter encoder is associated with a respective channel selection variable.

Each task-adapter encoder is configured to apply the gating mechanism on the stack of 2D channel outputs of each neural network layer using the corresponding channel selection variables of the neural network layer to select 2D channel outputs that should contribute to the layer output (e.g., a 3D tensor) of the layer and 2D channel outputs that can be discarded. The selected 2D channel outputs become 2D channel inputs for the next neural network layer of the task-adapter encoder. These channel selection variables are learned during the joint training of the shared encoder 104 and the multiple task-adapter encoders as described in detail below with respect to FIG. 3.

In particular, the gating mechanism applied to each 2D channel output in the stack of 2D channel outputs performs a nonlinear transformation on the 2D channel output using the respective channel selection variable as follows:

$$\tilde{f}_{k,i,c}(x) = \sigma(a_{k,i,c}) \cdot f_{k,i,c}(x), \qquad (2)$$

where $\sigma(\bullet)$ is a non-linear transformation that maps its input to non-negative real numbers, i.e., $\mathbb{R} \rightarrow \mathbb{R}^+$.

For example, the non-linear transformation includes a clipped ReLU operation defined as follows:

$$\sigma(a; s) = \min(1, ReLu(s \cdot a + 0.5)). \qquad (3)$$

The slope of the non-linearity s is progressively increased during training, in such a way that, as $s \rightarrow \infty$, Equation (3) acts as a gating function.

It is noted that when the gating non-linearity is driven to output either 0 or 1 by progressively increasing the value of s during training, it is locked at this value, as the gradients are equal to zero. Therefore, it performs a hard selection of those channels that are contributing to the layer output and those that can be discarded. That is, when the output of the clipped ReLU operation is 1, the respective 2D channel output is selected to be a 2D channel input to the next neural network layer of the task-adapter encoder. When the output of the clipped ReLU operation is 0, the respective 2D channel output is not selected to be a 2D channel input to the next neural network layer of the task-adapter encoder.

The number of active channels/channel outputs in the i-th layer of the k-th task-adapter neural network is equal to:

$$C_{k,i} = \sum_{c=1}^{C_{k,i}} \mathbb{1}\,\sigma(\alpha_{k,i,c}) > 0, \qquad (4)$$

where $\mathbb{1}\,\sigma(a_{k,i,c})$ is an indicator function that equals to 1 when $\sigma(a_{k,i,c})$ is greater than zero and equals to 0 otherwise.

During training of the multi-task adapter neural network 110, the shared encoder 104 and the task-adapter encoders are jointly trained to optimize a loss function that represents performance of the multi-task adapter neural network 110 on the multiple machine learning tasks and a computational cost to perform the multiple machine learning tasks.

More specifically, the loss function is a weighted sum of cross-entropy losses for the multiple machine learning tasks and the computational cost of computing the predicted outputs by the task-adapter encoders for a given set of channel selection variables.

The process of training the multi-task adapter neural network 110 is described in more detail below with reference to FIG. 3.

Figure 2:
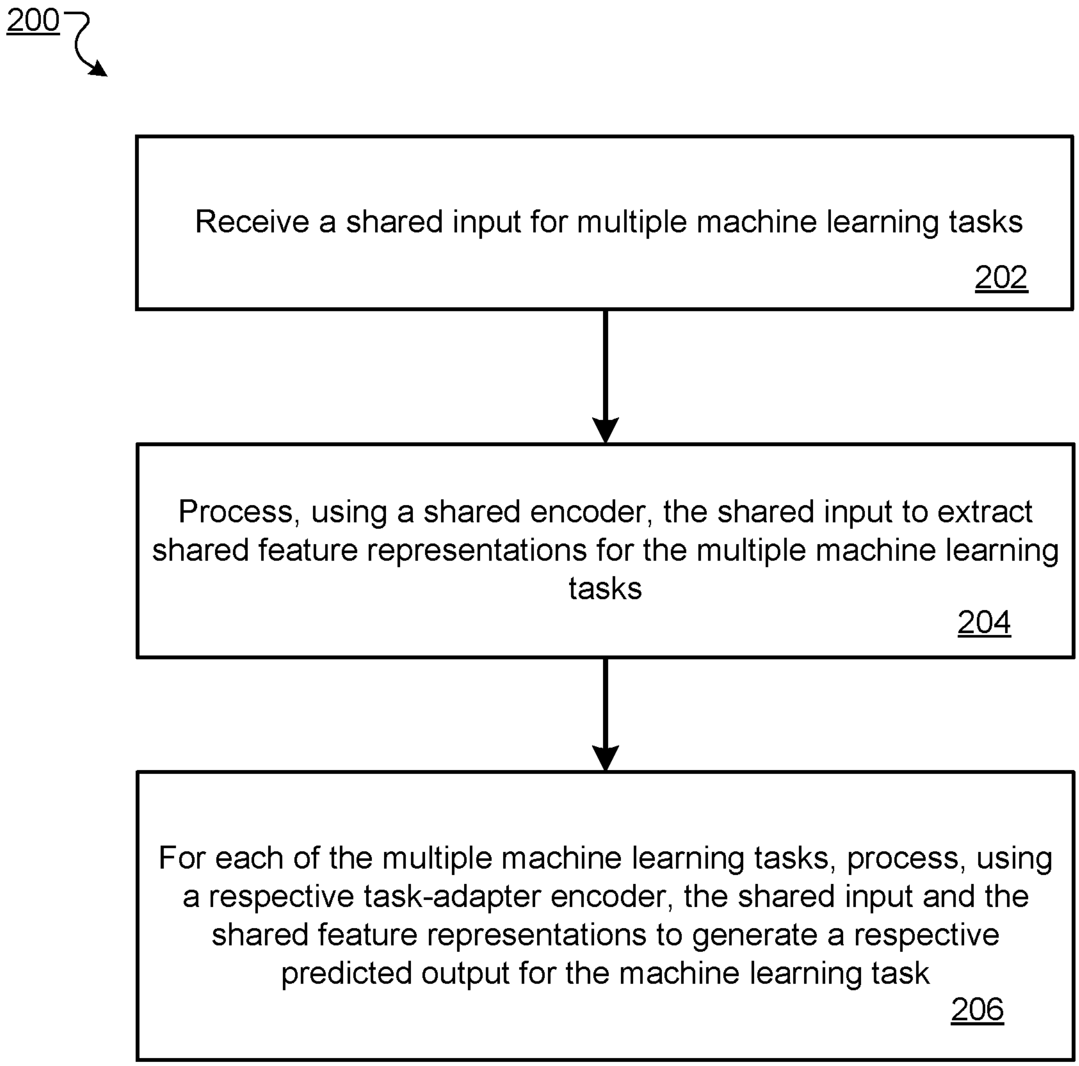
FIG. 2 is a flow diagram of an example process for generating a respective predicted output for each of the machine learning tasks given a shared input.

FIG. 2 is a flow diagram of an example process for generating a respective predicted output for each of multiple machine learning tasks given a shared input. For convenience, the process 200 will be described as being performed by a system of one or more computers located in one or more locations. For example, a neural network system, e.g., neural network to system 100 of FIG. 1, appropriately programmed in accordance with this specification, can perform the process 200.

The system receives a shared input for multiple machine learning tasks (step 202). The shared input is a two-dimensional channel input. For example, the shared input is an audio recording that has a two-dimensional channel for time and frequency.

The system processes, using a shared encoder, the shared input to extract shared feature representations for the multiple machine learning tasks (step 204).

In particular, the each of the neural network layers following the first layer in the shared encoder receives as input an output of the previous neural network layer in the shared encoder and outputs a three-dimensional (3D) tensor which is a stack of two-dimensional channel outputs (that are stacked along a channel dimension).

The shared representations (i.e., 3D tensors) outputted by the neural network layers of the shared encoder are shared among the multiple task-adapter encoders and are used by the task-adapter encoders to compute a predicted output for each machine learning task.

For each of the multiple machine learning tasks, the system processes, using a respective task-adapter encoder, the shared input and the shared feature representations to generate a respective predicted output for the machine learning task (step 206).

In particular, each of the neural network layers of each task-adapter encoder receives as layer input a concatenation of a 3D tensor outputted by the previous layer in the task-adapter encoder and a 3D tensor outputted by the corresponding previous layer in the shared encoder 104 along the channel dimension. The layer input is a stack of 2D channel inputs. Each neural network layer of each task-adapter encoder then processes the layer input to output a 3D tensor which is a stack of 2D channel outputs along the channel dimension.

Each task-adapter encoder includes a respective output layer as the last layer. That is, each task-adapter encoder includes an appropriate kind of output layer for the corresponding machine learning task. For example, for classification tasks, the output layer is a softmax neural network layer. The output layer is configured to receive as input a concatenation of the output produced by the last layer of the shared encoder and the layer output produced by the previous layer of the task-adapter encoder, and to process the input to generate a predicted output for the respective machine learning task.

The techniques described herein can solve multiple tasks simultaneously and more accurately by sharing representations via a shared encoder and task-specific adapter encoders at different depths. This allows common representations to be augmented, which in turn leads to better performance, e.g., higher accuracy, for the multi-task adapter neural network. FIG. 4 shows experimental results where the use of the described multi-task adapter neural network results in higher accuracy compared to using a baseline architecture given the same target computational cost.

Figure 3:
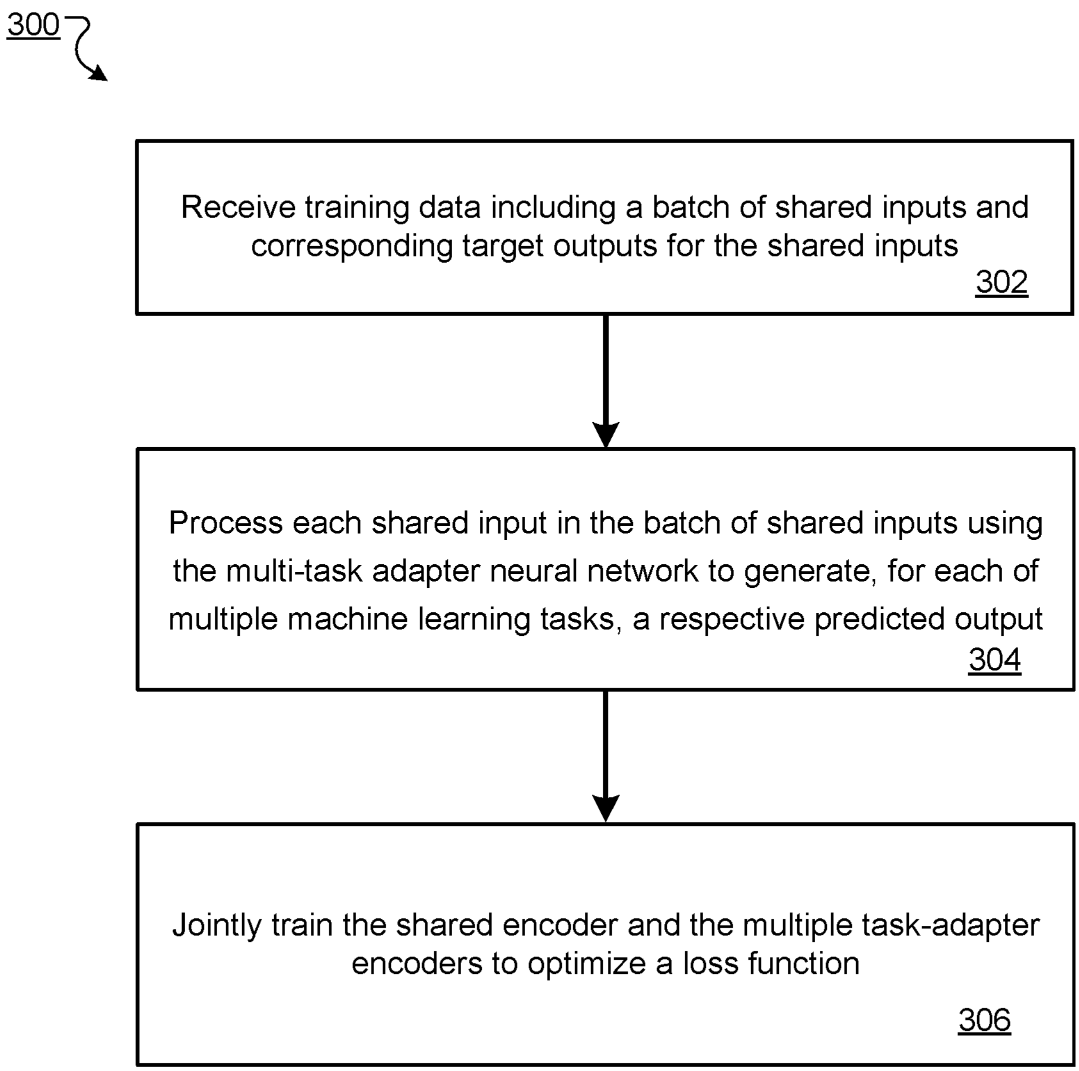
FIG. 3 is a flow diagram of an example process for training a multi-task adapter neural network.

FIG. 3 is a flow diagram of an example process for training a multi-task adapter neural network. For convenience, the process 300 will be described as being performed by a system of one or more computers located in one or more locations. For example, a neural network system, e.g., neural network system 100 of FIG. 1, appropriately programmed in accordance with this specification, can perform the process 300. The multi-task adapter neural network includes a shared encoder and multiple task-adapter encoders.

The system can repeatedly perform the process 300 on different batches of training data to train the multi-task adapter neural network, i.e., to repeatedly adjust the values of parameters of the multi-task adapter neural network.

The system receives training data including a batch of shared inputs and corresponding target outputs for the shared inputs (step 302).

The system processes each shared input in the batch of shared inputs using the multi-task adapter neural network to generate, for each of multiple machine learning tasks, a respective predicted output (step 304).

The system jointly trains the shared encoder and the multiple task-adapter encoders using the training data and the predicted outputs to optimize a loss function (step 306). Generally, the loss function is a combination of cross-entropy losses for the plurality of machine learning tasks and a penalty term that represents a computational cost of computing the predicted outputs by the multiple task-adapter encoders.

In particular, the system determines, for each of the multiple machine learning tasks, a respective cross-entropy loss that measures performance of the respective task-adapter encoder on the machine learning task. Cross-entropy losses are described in R. Y. Rubinstein and D. P. Kroese, The cross-entropy method: a unified approach to combinatorial optimization, Monte-Carlo simulation and machine learning. Springer Science & Business Media, 2013.

The system determines, for each of the task-adapter encoders, a respective penalty term that captures a computational cost of computing a predicted output by the task-adapter encoder for a given set of channel selection variables. For example, the penalty term for task-adapter encoder k, denoted as $$C_k^{adapters},$$

can be computed as follows:

$$C_k^{adapters} = \sum_{i=1}^{L} \eta_{i,k} \cdot \|\sigma(a_{k,i})\|_1 \cdot (C_{0,i-1} + \|\sigma(a_{k-1,i})\|_1). \quad (5)$$

where $a_{k,i}$ trainable channel selection variables that modulate the output of each channel of the task-adapter encoders, and $\sigma(\bullet)$ is a non-linear transformation that maps its input to non-negative real numbers, i.e., $\mathbb{R} \rightarrow \mathbb{R}^+$.

For example, the non-linear transformation includes a clipped ReLU operation as defined in Equation 3:

$$\sigma(a; s) = \min(1, ReLu(s \cdot a + 0.5)). \quad (3)$$

The system jointly trains the shared encoder and the multiple task-adapter encoders to optimize a loss function that is a weighted sum of the cross-entropy losses and the penalty terms. For example, the system can backpropagate an estimate of a gradient determined from the loss function to jointly adjust current values of parameters of the shared encoder and the multiple task-adapter encoders. The loss function can be expressed as follows:

$$\mathcal{L} = \sum_{k=1}^{K} w_k [\mathcal{L}_k^{XE} + \lambda C_k^{adapters}], \quad (6)$$

where $$\mathcal{L}_k^{XE}$$

is the cross-entropy loss for the k-th task, $w_k$ is an optional weighting term. The Lagrange multiplier $\lambda$ indirectly controls the target cost, i.e., when $\lambda=0$, the system minimizes the cross-entropy $$\text{loss } \mathcal{L}_k^{XE}$$

only, thus potentially using all of the available computational capacity, both of the shared encoder and of the task-adapter channels (i.e., $c_{k,i}=C_{k,i}$). Conversely, when $\lambda$ increases, the use of additional channels is penalized, thus inducing the task-adapter encoders to use fewer channels. It is noted that in Equation 5, $\|\sigma(a_{k-1,i})\|_1$ is upper bounded by $\alpha \lfloor C_{0,i-1} \rfloor$. Therefore, when $\alpha<<1$, the second term $(C_{0,i-1}+\|\sigma(a_{k-1,i})\|_1)$ in Equation 5 is dominated by the constant $C_{0,i-1}$, and $$C_k^{adapters}$$

is proportional to the 1-norm of the gating variable vector, thus promoting a sparse solution in which only a subset of the channels are used.

As the training progresses, the slope of the non-linearity s in Equation 3 is progressively increased, in such a way that, as $s\rightarrow\infty$, Equation (3) acts as a gating function. When the gating non-linearity is driven to be either 0 or 1, it is locked at this value, as the gradients are equal to zero.

Therefore, after training, the slop s can be set to the value that causes the system to operate with a hard gating, i.e., it performs a hard selection of those channels that are contributing to the layer output and those that can be discarded. That is, when the output of the clipped ReLU operation is 1, the respective 2D channel output is selected to be a 2D channel input to the next neural network layer of the task-adapter encoder. When the output of the clipped ReLU operation is 0, the respective 2D channel output is not selected to be a 2D channel input to the next neural network layer of the task-adapter encoder.

FIG. 4 shows experimental results where the use of the described multi-task adapter neural network results in higher accuracy compared to using a baseline architecture, given the same target computational cost.

The experiment evaluates the described multi-task adapter neural network by computing classification accuracy of each of 8 different audio-based tasks, covering both speech and non-speech related tasks. The classification accuracy of the multi-task adapter neural network is compared to the accuracy of a baseline architecture, which is a multi-head architecture including a shared encoder and 8 different fully connected layers, one for each task. As shown in FIG. 4, the Lagrange multiplier $\lambda$ is varied to target different cost levels (e.g., $\lambda=10^{-2}$ and $\lambda=10^{-4}$). When using number of parameters as cost measure, the accuracy of the multi-task adapter neural network goes from 0.71 (i.e. accuracy of the baseline architecture) to 0.74 (+8 k parameters) and 0.75 (+30 k parameters). When using FLOPs as cost measure, the accuracy of the multi-task adapter neural network goes to 0.72 (+2.0 m FLOPs) and 0.76 (+4.8 m FLOPs).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising: one or more storage devices; and one or more processors storing instructions that, when executed by the one or more processors, cause the one or more processors to implement a multi-task adapter neural network for performing a plurality of machine learning tasks, wherein the multi-task adapter neural network is configured to:

- receive a shared input for the plurality of machine learning tasks, and
- process the shared input to generate, for each of the plurality of machine learning tasks, a respective predicted output;
- wherein the multi-task adapter neural network comprises:
  - a shared encoder configured to:
    - receive the shared input, and
    - process the shared input to extract shared feature representations for the plurality of machine learning tasks; and
  - a plurality of task-adapter encoders, wherein each of the plurality of task-adapter encoders is associated with a respective machine learning task in the plurality of machine learning tasks and is configured to:
    - receive the shared input, receive the shared feature representations from the shared encoder, and process the shared input and the shared feature representations to generate the respective predicted output for the respective machine learning task, wherein layers of the plurality of task-adapter encoders are arranged in parallel with corresponding layers of the shared encoder, and wherein at least one layer of each task-adapter encoder is configured to receive as input a combination of (i) an output of a layer preceding the corresponding layer of the shared encoder and (ii) an output of a previous layer of the task-adapter encoder.

2. The system of claim 1, wherein the plurality of machine learning tasks comprises audio processing tasks.

3. The system of claim 1, wherein each of the plurality of task-adapter encoders comprises a plurality of neural network layers, and is configured to apply a gating mechanism on channel outputs of a neural network layer of the plurality of neural network layers to select channel inputs for the next neural network layer of the plurality of neural network layers.

4. The system of claim 1, wherein the task-adapter encoders are arranged in parallel with the shared encoder.

5. The system of claim 1, wherein the shared encoder comprises a plurality of convolutional neural network layers.

6. The system of claim 5, wherein each of the plurality of task-adapter encoders comprises a plurality of convolutional neural network layers.

7. The system of claim 6, wherein the shared encoder and each of the plurality of task-adapter encoders have the same number of convolutional neural network layers.

8. The system of claim 6, wherein each of the plurality of neural network layers of each of the plurality of task-adapter encoders outputs a three-dimensional tensor which is a stack of two-dimensional channel outputs.

9. The system of claim 8, wherein each of the plurality of neural network layers in the shared encoder receives as input an output of a previous neural network layer in the shared encoder.

10. The system of claim 9, wherein each of the neural network layers in each of the plurality of task-adapter encoders receives as layer input a concatenation of a three-dimensional tensor of the previous layer in the task-adapter encoder and a three-dimensional tensor of the corresponding previous layer in the shared encoder along a third dimension, the layer input being a stack of two-dimensional channel inputs.

11. The system of claim 10, wherein each two-dimensional channel output in the stack of two-dimensional channel outputs generated by each neural network layer in each of the plurality of task-adapter encoders is associated with a respective channel selection variable.

12. The system of claim 11, wherein each of the plurality of task-adapter encoders is configured to apply a gating mechanism on the stack of two-dimensional channel outputs of each neural network layer using the corresponding channel selection variables of the neural network layer to select relevant two-dimensional channel inputs for the next neural network layer of the task-adapter encoder.

13. The system of claim 12, wherein the gating mechanism applied to each two-dimensional channel output in the stack of two-dimensional channel outputs performs a nonlinear transformation on the two-dimensional channel output using the respective channel selection variable.

14. The system of claim 13, wherein the nonlinear transformation includes a clipped ReLU operation.

15. The system of claim 14, wherein when the output of the clipped ReLU operation is 1, the respective two-dimensional channel output is selected to be a two-dimensional channel input to the next neural network layer of the task-adapter encoder.

16. The system of claim 14, wherein when the output of the clipped ReLU operation is 0, the respective two-dimensional channel output is not selected to be a two-dimensional channel input to the next neural network layer of the task-adapter encoder.

17. The system of claim 10, wherein a computational cost of each neural network layer in each of the plurality of task-adapter encoders is proportional to the number of two-dimensional channel outputs in the stack of two-dimensional channel outputs of the neural network layer multiplied by the number of two-dimensional channel inputs in the stack of two-dimensional channel inputs of the neural network layer.

18. The system of claim 1, wherein the shared input is a two-dimensional channel input.

19. The system of claim 18, wherein the shared input is an audio recording that has a two-dimensional channel for time and frequency.

20. The system of claim 18, wherein the shared encoder comprises a plurality of neural network layers, and wherein each of the plurality of neural network layers of the shared encoder outputs a three-dimensional tensor which is a stack of two-dimensional channel outputs.

21. The system of claim 1, wherein the shared encoder and the plurality of task-adapter encoders are jointly trained to optimize a loss function that represents performance of the multi-task adapter neural network on the plurality of machine learning tasks and computational cost to perform the plurality of machine learning tasks.

22. The system of claim 21, wherein the loss function is a weighted sum of cross-entropy losses for the plurality of machine learning tasks and the computational cost of computing the predicted outputs by the plurality of task-adapter encoders for a given set of channel selection variables.

23. One or more non-transitory computer storage media storing instructions that, when executed by one or more computers, cause the one or more computers to perform operations for generating a respective predicted output for each of a plurality of machine learning tasks given a shared input, the operations comprising:

receiving a shared input for the plurality of machine learning tasks;

processing, using a shared encoder, the shared input to extract shared feature representations for the plurality of machine learning tasks; and for each of the plurality of machine learning tasks, processing, using a respective task-adapter encoder in a plurality of task-adapter encoders, the shared input and the shared feature representations to generate a respective predicted output for the machine learning task, wherein layers of the plurality of task-adapter encoders are arranged in parallel with corresponding layers of the shared encoder, and wherein at least one layer of each task-adapter encoder is configured to receive as input a combination of (i) an output of a layer preceding the corresponding layer of the shared encoder and (ii) an output of a previous layer of the task-adapter encoder.

24. A method for generating a respective predicted output for each of a plurality of machine learning tasks given a shared input, the method comprising:

receiving a shared input for the plurality of machine learning tasks;

processing, using a shared encoder, the shared input to extract shared feature representations for the plurality of machine learning tasks; and for each of the plurality of machine learning tasks, processing, using a respective task-adapter encoder in a plurality of task-adapter encoders, the shared input and the shared feature representations to generate a respective predicted output for the machine learning task, wherein layers of the plurality of task-adapter encoders are arranged in parallel with corresponding layers of the shared encoder, and wherein at least one layer of each task-adapter encoder is configured to receive as input a combination of (i) an output of a layer preceding the corresponding layer of the shared encoder and (ii) an output of a previous layer of the task-adapter encoder.

* * * * *